C. G. STRANDLUND.
GANG PLOW.
APPLICATION FILED JAN. 15, 1915. RENEWED FEB. 11, 1921.
1,376,787.
Patented May 3, 1921.
5 SHEETS—SHEET 1.
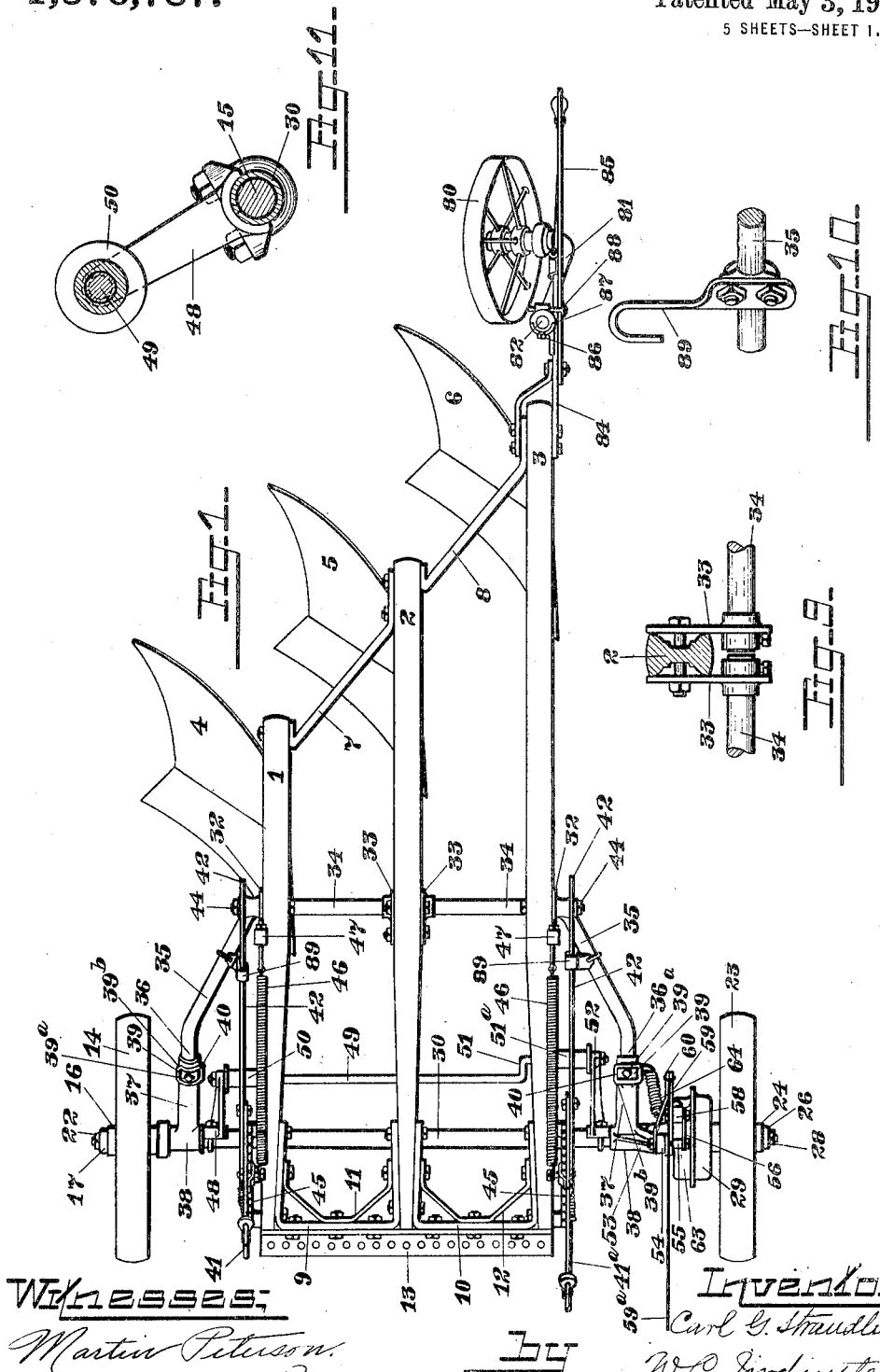

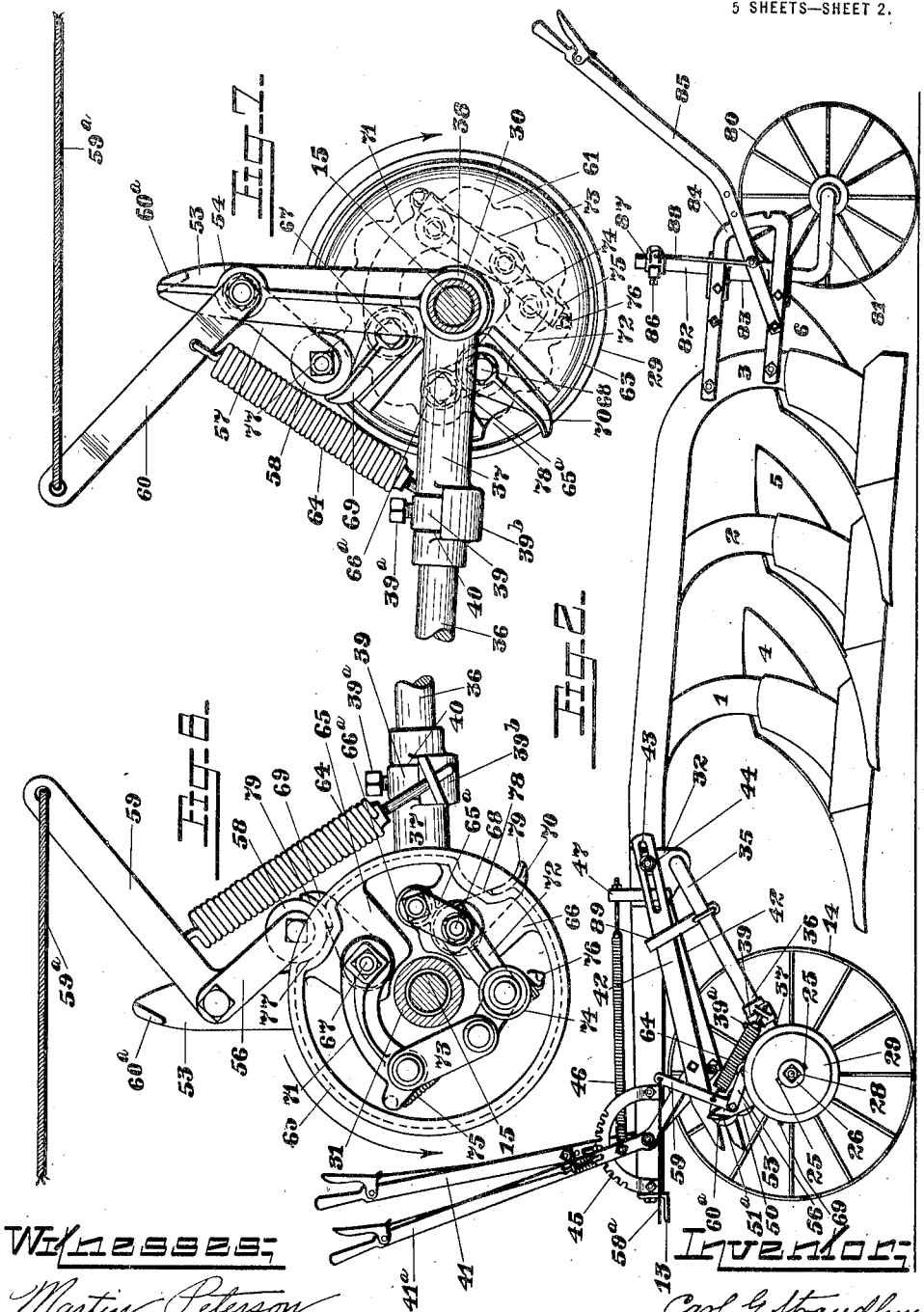

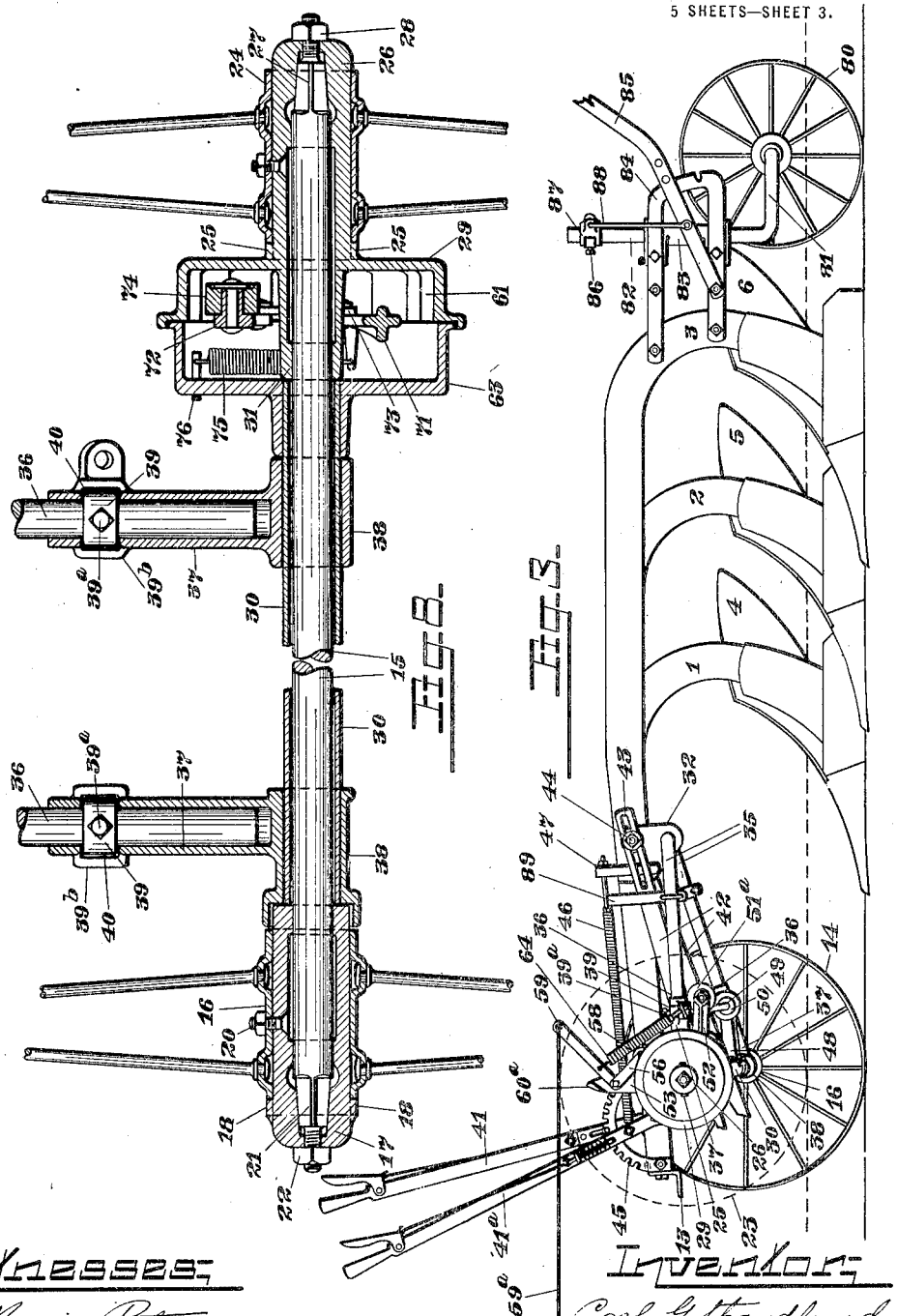

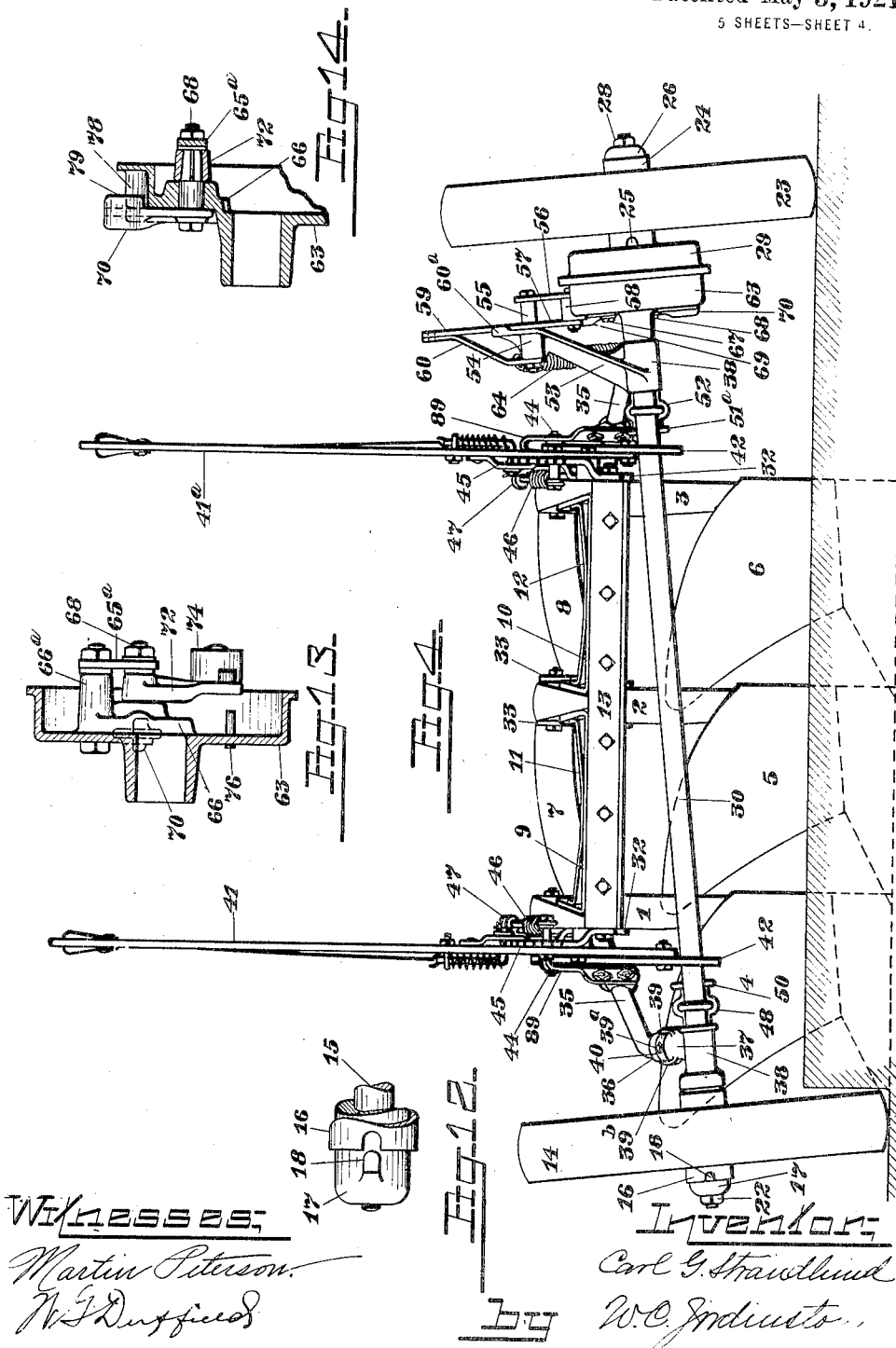

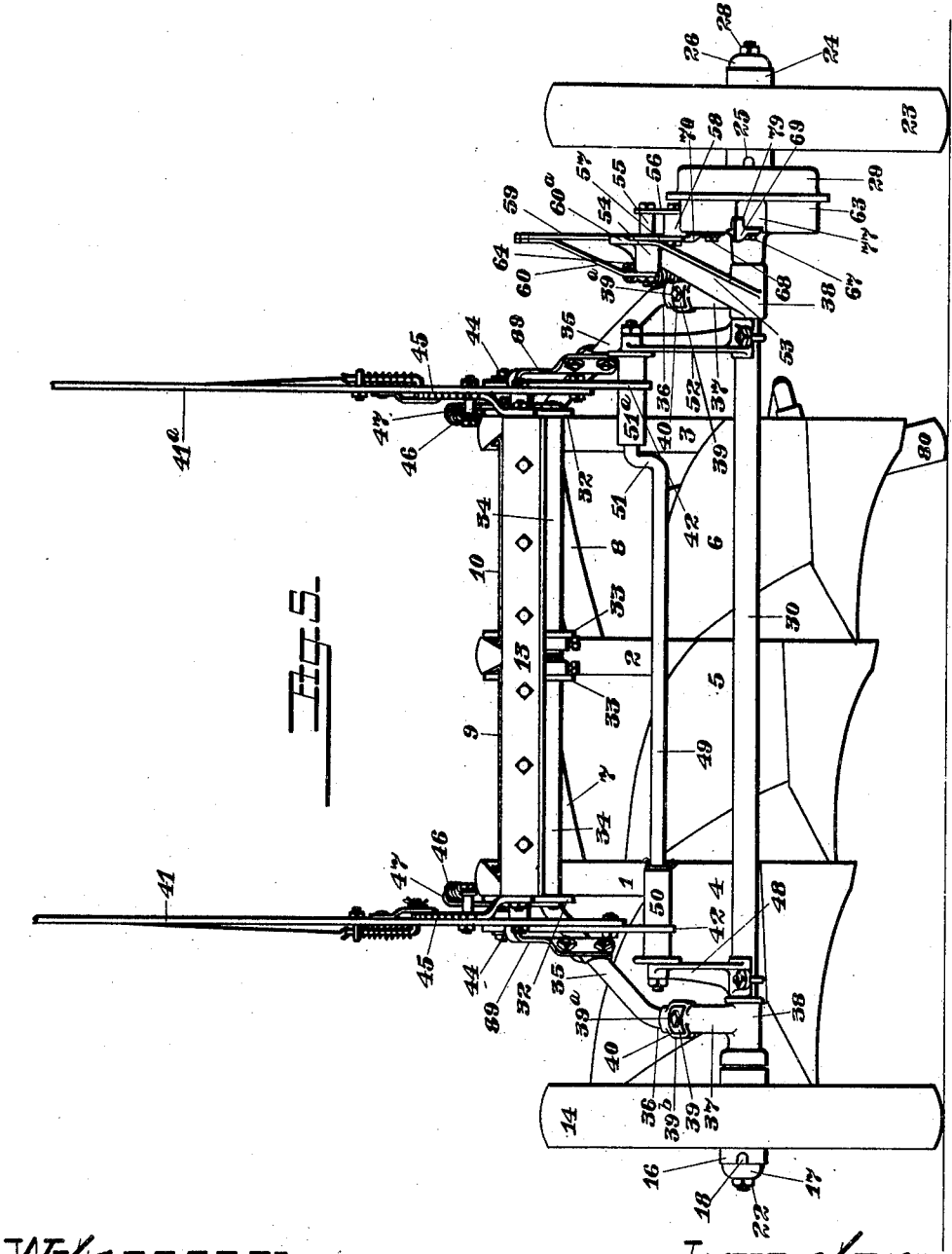

UNITED STATES PATENT OFFICE.

CARL G. STRANDLUND, OF MOLINE, ILLINOIS, ASSIGNOR TO DEERE & COMPANY, OF MOLINE, ILLINOIS, A CORPORATION OF ILLINOIS.

GANG-PLOW.

1,376,787.     Specification of Letters Patent.     Patented May 3, 1921.

Application filed January 15, 1915, Serial No. 2,343. Renewed February 11, 1921. Serial No. 444,266.

*To all whom it may concern:*

Be it known that I, CARL G. STRANDLUND, a citizen of the United States, residing at Moline, in the county of Rock Island and State of Illinois, have invented certain new and useful Improvements in Gang-Plows, of which the following is a specification, reference being had therein to the accompanying drawing.

My invention relates to gang plows of the class including those of which each has a plurality of plow bottoms, each carried by a beam, all of the beams being secured rigidly together at their forward ends to form a unitary frame, together with a rear furrow wheel which carries the rear part of the plow system and runs in the last furrow that is being cut, and also a front furrow wheel and a land wheel. Plows of this class are so made that they can be drawn by tractors.

One of the objects of my invention is to so construct plows of this class that greater traction power can be derived from its ground supports, provision being made for connecting the land and the furrow wheels by an axle extending from side to side of the structure, the frame having a flexible connection with the traction support referred to, and provision also being made of suitable mechanism whereby the traction power can be taken from the wheels at will to raise or lower the frame and plows.

Another object of the invention is to provide means to regulate the depth of plowing by adjusting the frame so that the latter when raised will be practically parallel with the ground.

A further object of the invention is to connect the parts which rest upon the ground with the frame by forwardly projecting cranks or bails in such way that they and their connecting devices can follow the inequalities of the surface without affecting the plowing action when the plow is in the ground; the said bails also being adapted to be forced automatically by the power toward vertical positions for the purpose of raising the frame.

Other objects will be clearly described and claimed hereinafter.

Referring to the drawings in which similar numerals indicate identical parts—

Figure 1 is a plan view of a gang plow embodying my improvements.

Fig. 2 is a side elevation with the land wheel removed and the plow raised out of the ground.

Fig. 3 is a similar view to Fig. 2, the plow being shown in position for plowing.

Fig. 4 is an enlarged front elevation showing the position of the plow and connected parts when the plow is in operation.

Fig. 5 is a similar view with the plow raised.

Figs. 6 and 7 are detailed views of the clutch.

Fig. 8 is a detailed section taken longitudinally of the axle.

Figs. 9, 10, 11, 12, 13, and 14 are detail views.

The gang plow illustrated in the drawings is a triple gang, that is it has three plowing elements comprising beams 1, 2 and 3 to which are attached plows 4, 5 and 6 of a well known type. The beams 1, 2 and 3 are held rigidly together by braces 7 and 8 extending from one beam to the other and securely bolted thereto. Forwardly the beams 1, 2 and 3 are connected by yoke shaped braces 9 and 10 securely bolted thereto; added rigidity is given the structure by braces 11 and 12 which are bolted to the braces 9 and 10 and the beams 1, 2 and 3; a draft bar 13 extends across the front of the gang and is rigidly bolted to the braces 9 and 10. The draft bar to which the tractor is connected, and the plow beams and braces form practically a frame of rigid construction adapted to be raised and lowered as a whole by the mechanism hereinafter described.

A furrow wheel 14 is mounted on an axle 15 and is permanently connected therewith in the following manner; within the hub 16 of the furrow wheel 14 is a box 17 having oppositely disposed lugs 18 which engage with notches in the outer end of the hub; a bolt 20 is also employed to secure the box 17 and hub 16 together and to carry part of the strain which would otherwise have to be sustained by the lugs 18. The end 21 of the axle 15, within the box 17, is squared to fit with a square socket in the box, and has its extreme end reduced and threaded and projecting through an orifice in the end of the box 17 where it is held by a nut 22. The land wheel 23 is mounted on the opposite end of the axle 15, the hub 24 having notches which engage lugs 25 on the box 26; the end of the axle 15 is squared to fit in a square socket in the box 26, the extreme end of the axle being reduced and threaded and extended through an orifice in the outer end of the box 26 and held therein by a nut 28, a suitable bolt passing through a wall of the box 26 and holding them rigidly together. The box 26 is preferably integral with a casing 29 forming part of a clutch mechanism which will be more fully described hereinafter. By the construction just described it will be understood that the axle 15, the furrow wheel 14, and the land wheel 23 revolve together.

The axle 15 revolves within a tubular member or hollow shaft, which extends from the inner end of the hub 16 of the furrow wheel 14 to the hub 31 of the casing 29, the hub 31 being preferably an extension of the box 26. The axle 15 is flexibly connected with the gang of plows in the following manner: on the beams 1 and 3 I mount bearings 32, and on beam 2 I mount bearings 33 in alinement with the bearing 32. In these bearings are mounted two bails or cranks; each of which have horizontal parts 34 journaled in the aforesaid bearings, and also a forward and downward inclined part. The inclined part of each crank comprises the bar 35, 36, and the terminal element 37—38.

To provide a certain flexibility the terminal element 37, 38, is preferably connected loosely to the main part of the crank so that it can have a limited rocking motion. To accomplish this the part 37 is formed as a tubular sleeve fitting the part 35, 36, of the crank, and is held from displacement by collar 39 fastened by bolt 39$^a$. The sleeve element is enlarged at 39$^b$ for the collar, slots 40 being formed in the enlargement to allow the sleeve to oscillate without interference from the bolt, such oscillation being frequently advantageous during the raising or lowering of the plows, or when the wheels drop into a depression, such as a cross furrow or the like. The part 38 at the lower end of each crank is tubular and through it passes the aforesaid hollow shaft 30.

Pivotally mounted forwardly on the beams 1 and 3 respectively are levers 41 having a portion of their length below their pivots bent at a rearward angle and pivotally attached to rearwardly extending bars 42; the forward ends of the bars 42 extend beyond the axle 15 and their rear ends have slots 43 through which project bolts 44 secured on the beams 1 and 3 and having nuts or heads which hold the bars 42 in position.

The bars 42 are in contact with the axle 15 except when the gang of plows is out of the ground, and by operation of the levers 41 the bars 42 are raised or lowered to fix the depth of plowing desired, the slots 43 permitting free movement of the bars 42 during their adjustment. Mounted on the beams 1 and 3 adjacent the levers thereon are segmental racks 45 with the teeth of which dogs of the usual type on the levers 41 are adapted to engage to hold the levers 41 in any desired position of adjustment. Tension springs 46 are connected to the levers 41, above the pivots of the latter on the beams 1 and 3, and to standards 47 on said beams, the springs 46 lending material assistance in the operation of the levers 41 in actuating the bars 42 against the axle 15.

An arm 48 is rigidly secured on the tubular member 30 adjacent the furrowward sleeve 38, and on its free end is mounted an end of a rod 49 on which is loosely mounted an elongated roller 50; the rod 49 extends laterally parallel with the axle 15 to a rearward bend 51, when it is again bent parallel to said axle and has its landward end mounted in the free end of an arm 52 rigidly secured to the tubular member 30 adjacent the landward sleeve 38; a roller 51$^a$ is mounted on the rod 49.

Preferably forming part of the landward sleeve 38 is an arm 53 inclined toward the land wheel 23; in the free end of the arm 53 is a bearing 54 in which is journaled a short shaft 55 having on its landward end, and rigidly secured thereto, rearwardly extending arms 56 and 57 between the rearward ends of which is supported a roller 58. An upwardly extending lever 59 preferably integral with the arm 57, is strengthened by a brace 60 connected to the free end of the lever 59 and to the shaft 55. A rope or wire 59$^a$ is connected to the lever 59 and extends forwardly to the tractor where it is within easy reach of the operator, and is utilized to rock the lever 59, the forward movement of which is limited by a stop 60$^a$.

The casing 29 has internal rolling teeth 61 and an elongated hub 31 which contacts with the end of the tubular member 30: rigidly mounted on the tubular member 30 is a casing 63 the edge of which is adapted to fit within a flange on the edge of the casing 29 making a snug joint to exclude dust. The roller 58 travels on the periphery of the casing 63 and is held against it by a coil spring 64 connected to the lever 59 and to a lug on the landward sleeve 37. Bosses 65 and 66 are formed on the inner side of the casing 63 to form proper bearings for short shafts 67 and 68 which project on the outside of the casing 63; on the shaft 67, outside the casing 63, is secured a trip-dog 69, a similar trip-dog 70 being secured on the shaft 68. To offset strain upon the short shaft 68, when the roller 74 is engaged with the rolling teeth 61 in the casing 29, I provide a strap 65$^a$ one end of which is secured to the shaft 68 by a nut on the inner end thereof, the other end of the strap 65$^a$ being bolted to a stud 66$^a$ preferably integral with the casing 63. On the end of the shaft 67, inside the casing 63, is an arm 71 adapted to be rocked by the shaft 67 when the latter is actuated by the trip-dog 69. On the end of the shaft 68, inside the casing 63, is a cranked arm 72 adapted to be rocked by the shaft 68 when the latter is actuated by the trip-dog 70. A link 73 is pivotally connected to the free end of the arm 71 and to the free end of the crank arm 72. At the angle of the crank arm 72 is mounted a roller 74 adapted to engage with the rounded teeth 61 in the casing 29, and held in such engagement by the tension of a coil spring 75 one end of which is secured to the underside of the free end of the arm 71, and the other end secured to the casing 63 as at 76.

In the periphery of the casing 63, adjacent the trip-dogs 69 and 70 respectively, are depressions 77 and 78 in which the roller 58 descends to engage with the trip-dogs 69 and 70, the movement of the latter being limited by a flange 79 on the side of the free end of each trip-dog which is adapted to contact with a side of the adjacent depression. The parts just described form a clutch mechanism by which the means employed to lift the plow are actuated by the traction power of the traction support.

The parts of the clutch are so constructed and related that the driven element (the part 63 and its adjuncts) can rotate with a speed equal to that of the rotation of the driving element (29 and its adjunct parts), or with a speed higher than that of said element 29. The devices which hold the roller 74 are so positioned in relation to the adjacent parts and in relation to the axis that when it is seated in one of the series of recesses, between the teeth 61, it prevents the driven part 63 of the clutch from moving relatively backward, and the thrust from the driving element 29, through the roller 74, positively advances the part 63. But this roller 74 can swing inward toward the axis, and does so swing when the driven element 63 is (by force supplemental to the traction force) rotated ahead of the driving element 29, the roller at such time vibrating idly toward and from the axis and toward and from the bottoms of the recesses between the teeth 61, riding freely over the teeth successively. This provides for the dropping of the beams and plow bodies from their elevated positions in an advantageous manner, as will be more fully described below.

A rear furrow wheel 80 is mounted on a crank axle 81 the vertical portion 82 of which is loosely journaled in a sleeve 83 secured to upper and lower arms of a yoke 84 rigidly secured to the plow beam 3. A lever 85 is pivoted on the lower arm of the yoke 84 intermediate the sleeve 83 and the beam 3 and extends rearwardly and upwardly, and is provided with the usual type of latch the dog of which is adapted to engage with notches in the closed end of the yoke 84 as shown, the latter being substantially concentric with the pivot of the lever 85. Secured to the upper end of the vertical portion 82 of the crank axle 81, preferably by a nut 86, is a collar 87 to which is connected one end of a link 88 the lower end of which is connected to the lever 85. It will be readily seen that by operating the lever 85 the rear of the plow can be raised or lowered, the sleeve 83 moving freely on the vertical portion 82 of the crank axle 81, the plow being held in a raised or lowered position by engagement of the latch dog with a notch in the closed portion of the yoke 84. I do not however confine myself to this particular manner of raising or lowering the rear of the plow as other and equally efficient devices may be employed.

Upon the crank arms 35 are secured arms 89 having their free ends formed into hooks to engage with the bars 42 to prevent any possibility of the wheels 14 and 23 being carried rearward of the pivot of the crank arms 35 in the event the wheels should encounter an obstruction or drop into a dead furrow or other depression in the ground.

In the operation of my improved plow the parts being in the position shown in Figs. 1, 3 and 4, and it is desired to raise the plow so as to clear the plow bodies from the ground, a pull on the cable 59ª will rock the lever 59 and the arms 56 and 57, lifting the roller 58 from engagement with the trip-dog 69; the tension of the spring 75, connected to the arm 71 and the casing 63, forces the roller 74 into engagement with the rolling teeth 61, the arm 72, upon which the roller 74 is mounted being actuated simultaneously with the arm 71 by the link 73 which is connected to both arms. The casings 63 and 29 are now locked together, and as the latter constantly revolves with the axle 15 the casing 63 also revolves carrying with it the tubular member 30 to which the arms 48 and 52 are rigidly secured. At the beginning of the movement just described the rollers 50 and 51ª are practically in contact with the bars 42, and as the bars 42 are held rigidly in position on the beams 1 and 3 they are raised by the arms 48 and 52, raising at the same time the plow bodies from the ground to the position shown in Fig. 2.

The part 30, the arms 48 and 52, and the rollers 50 and 51ª constitute a train of power transmitting devices extending from the driven element of the clutch and bearing, in one direction, against the frame, and, in the other direction, against the longitudinally swinging cranks or bails. The latter are forced relatively backward at their lower ends and caused to travel toward a vertical position, and as the lower ends of the cranks remain fixed relatively to the axis of the land wheel and the front furrow wheel and relatively to the ground, the front end of the frame is elevated, and the plow bodies are lifted in the way just described, the frame at this time tilting or moving vertically around the rear furrow wheel.

After the lever 59 is rocked until in contact with the stop 60ª and the trip-dog passes under it by the revolution of the casing 63 to which the trip-dog is connected, the rope 59ª is released or slackened by the operator, and the lever 59 is rocked rearwardly by the tension of the spring 64 so that the roller 58 will rest and travel on the periphery of the casing 63 until the latter has made substantially one fourth of a revolution, when the roller will move into the depression 78 and against the trip-dog 70 holding the latter as the casing 63 revolves; the stopping of the trip-dog 70 actuates the short shaft 68 and the arm 72 to withdraw the roller 74 from engagement with the rolling teeth 61 in the casing 29, the latter revolving as will be understood until such disengagement takes place and the flange 79 on the trip-dog 70 contacts with the side of the depression 78, When the roller 74 is disengaged from the rolling teeth 61 in the casing 29 the latter continues to revolve with the axle 15, but the casing 63 is held stationary, the plow is raised from the ground and the parts are in the positions shown in Fig. 2. The arms 48 and 52 are now inclined forwardly at an angle to the vertical axis of the wheels 14 and 23, the weight of the plow resting on the rollers 50 and 51ª on the rod 49; the forward inclination of the arms 48 and 52 causes the weight of the plow to hold the parts locked together so that the plow cannot be lowered until the clutch is tripped for that purpose. The bails 35 fix the relative position of the plow and axle to each other, holding the land wheel and the front furrow wheel in proper positions relatively to the frame, and rock upwardly or toward the vertical, as aforesaid, as the plow is raised so that the movement of the plow when raised or lowered is concentric to the axle 15.

I have shown the arms 48 and 52 of unequal length, but they can be equal length however and raise the plow in substantially the same manner; I find it however more preferable to adopt the structure shown, getting a better result in raising the plow.

The depth to which it is desired the plows shall operate is regulated by actuating the levers 41 and 41ª to raise or lower the bars 42 which support the plow on the tubular member 30 on the axle 15, the bars 42 having a longitudinal movement during their adjustment as provided for by the slots 43 therein and the bolts 44 which connect the rear ends of the bars 42 to the plow. The adjustment of the plow to the desired depth of work however, does not affect the plow being raised in substantial lateral parallelism with the ground.

When it is desired to throw one side or the other of the system of plow bottoms downward or upward from the position shown in Fig. 4, this can be accomplished by properly adjusting the levers 41, 41ª. As their points of bearing on the cross tube 30 are varied, they will cause a relative tilting landward or furrow-ward of the frame, such tilting being around a line from the land wheel to the front furrow wheel. Similarly when the plow bottoms are in their elevated positions as shown in Fig. 5, if it be desired to tilt or rock them around the line connecting the last said wheels, it can be done by proper adjustment of the levers.

In lowering the plow from the raised position shown in Figs. 2 and 5, the lever 59 is again actuated by a pull on the rope 59ª, the roller 58 is released from engagement with the trip-dog 70 and the tension of the spring 75 causes the roller 74 to again engage with the rolling teeth 61 locking the casings 63 and 29 together, the roller 74, when clear of the trip-dog 70 traveling on the periphery of the casing 63 as the latter revolves until the roller 74 contacts with the trip 69 when the parts are again thrown out of operation as previously described. The casing 63 being permanently connected to the tubular member 30 the latter revolves therewith carrying with it the arms 48 and 52 which are connected by rod 49. As the arms 48 and 52 revolve forwardly the rollers 50 and 51ª travel forwardly on the bars 42 and gradually lower them until they are supported on the axle 15 and rest upon the tubular member 30. By flexibly connecting the plow with the axle the latter will have no effect upon the plow when operating on rough ground, the wheels following the conformation of the surface freely, in other words if one or both of the wheels should drop into an ordinary depression, the axle dropping out of contact with the bars 42 at the same time, the wheels would rise before the plow would follow the depression and the bars 42 would again be in contact with the axle. It may occur that the mechanism will be tripped by the operator to raise the plow as the wheels enter a depression, this will not effect the raising of the plow however, for the mechanism will be actuated just the same and the plow raised to the full limit when the wheels again rise to level ground.

The tractor is connected directly to the plow and has no connection with the axle, consequently in the operation of raising the plow the latter moves forwardly at the same speed as the tractor and at a greater speed than the wheels and axle.

While I have shown a plow having three plow bodies or units it will be understood that more or less than three may be used without in any way impairing the efficiency of my invention. It will be seen that I have so applied the system of power transmitting devices (having a driving element and a driven element optionally connected with, but automatically disengageable from, said element) and have so arranged these and the parts which hold the transmitting devices against accidental movement, that I dispense with locking devices such as have heretofore been used (for holding the driven clutch element fixed relatively to the frame and also holding the abutment for the transmitting devices after said driven element and said abutment have been entirely separated) which locks require supplemental and preliminary manual movement before the automatic lifting devices can be brought into action.

It will also be seen that with a clutching system such as described (one including within itself starting and stopping and locking devices) the two separable parts of the clutch, under any of the desired adjustments of parts, will, during all lifting efforts, remain in engagement over equal arcs of travel, although the adjustments attainable with the levers provide for variations in depth of plowing.

There are positively driven connecting devices between, and immediately adjacent, the driving and driven elements (in the power transmitting train) both when the cranks are moved relatively downward away from the beam structure and also during the time while they are again approaching that structure, and they provide positive connection of said elements during the last part of the cycle.

The limit of greatest angulation of the cranks is fixed by the radius of the eccentrically positioned contacting elements 50, $51^a$, and although the positions of the bars 42, $42^a$, can be varied by the levers 41, $41^a$, the length of the path of angular travel of the driven clutch element is not varied by such adjustments, and the total path of the travel of the cranks is approximately fixed for all lifting efforts, although the distance, downward, to which the plow bodies can move will be increased or decreased to attain the desired variations in depth of plowing.

The intermittingly rotating driven element of the clutch, on the one hand, and the depth adjusting devices on the other hand, are so related that there is a movement (here a swinging movement) of one relatively to the other. The levers 41, $41^a$ and bars 42, can be set for any depth of plowing required without varying the position of the clutch element 63 relatively to its axis. After the depth levers have been adjusted to any particular point, the lifting power train acts upon them substantially the same as it acts under any other adjustment, the total arc of travel of the cranks at any one time being equal to the arc of travel at any other time, the distance between the axis of the traveling element 63 and the axis of the depth lever $41^a$, however, varying for each adjustment.

The dog at 74 not only prescribes the instant when the two clutch elements shall interengage to automatically start the up swinging of the cranks (and the down swinging of the beam structure) but also automatically prescribes the point where they shall interengage to cause the commencement of the swinging of the cranks in the opposite direction, or downward, and the upward lifting of the beam structure.

The mechanism in this respect differs materially from the earlier ones that have been proposed for which driving trains were suggested, each comprising a one-way ratchet wheel and dog system, the dog to be separable entirely from the driving ratchet wheel at the end of each lifting effort. Such mechanisms require devices entirely outside of, and supplemental to, the power train to lock the cranks after their downward movement and to sustain the elevated weight of the beams and plows. The movement of the wheel cranks in the opposite direction was accompanied by the sudden down drop of the bodies and of the beam structure, without any automatic positive fixing of the point where the power lift train is to commence to be again effective in forcing down the cranks and lifting the load. Manual work and discretion of the operator were required to fix the final limit of each up movement of the cranks and each down movement of the plows, instead of this limit being fixed invariably, automatically, as in the present case.

In the present mechanism the prime element (as for example the driven clutch member 63) of the transmitting train continues, even when stationary, to have an efficiency in respect to the other parts (as the hollow shaft 30, arms 48—52, bar 49, and rollers 50, $51^a$) of that train. It holds them, at all times, in their proper relative positions, not allowing them to reverse, and advancing with them, by intermitting steps, continually in one direction, as described.

There are other advantages incident to a mechanism such as herein shown, that is, supplemental to those above described. For example, by mounting on the crank system both the continuously rotating prime power element (actuated by the ground wheel) and the prime element of the intermittingly actuated train, the mechanism, as an entirety, can be greatly simplified, as the power for forcing the cranks away from the beam structure can be exerted by having the transmitting elements above referred to exert a direct upward thrust against said structure, preferably against an adjustable abutment secured thereto, such as the levers 41, 41ª, through bars 42, 42. Both parts of the clutch device, in the present case, are swung together downward with the crank system away from the frame.

For several reasons I prefer to relate the inclined part of the power crank system to the ground wheel and to the power transmitting devices in the way shown. By placing the two clutch elements at the lower end of the crank and having them swing therewith I simplify and strengthen the transmitting mechanism. The driven element of the clutch is firmly supported by the ground wheel and the crank. A single controller as at 56, 59, can be used, arranged to swing with the crank, all of its successive actuations being similar to each other when pulled by the cord 59ª, the latter readily adapting itself to any positions, vertically, of the clutch and controller.

The power is taken from the intermitting element 63 at points close to the crank, and strains from torsion are obviated. The eccentrically revolving transmitting element such as the arm 52, rotates directly with the driven element 63 of the clutch. In the present construction the shaft 30 (here hollow) acts as a journal for the clutch element 63, permitting it to revolve independently of the ground wheel, and this journal element carries the terminal parts of the power transmitter.

The journal part 30 being formed separately from the crank, proper provision is made for rotating it in the end of the crank and for transmitting power from points in longitudinal vertical planes on the land side of the crank to points in planes on the furrow side. By having the driven part of the clutch close to the crank, the final or terminal power transmitting device (here the parts 50, 51ª) can be positioned directly below, or in the vertical longitudinal planes of the parts requiring movements vertically upward, and therefore the power can be taken to the beam structure directly, though preferably as aforesaid through an adjustable abutment rigid with that structure; the final abutment here being the hand lever and its rigid lock.

The driven element 63 of the clutch is so related to the angular movements of the several parts that when the beam structure is in its highest position the lifting arms 48, 52, stand, practically, in "dead center" relation with the axis of the clutch. This assists materially in holding the cranks down and the beam structure and plow bodies up, and relieves the holder or lock at 58 of a considerable part of the strain. It is desirable to carry these arms 48, 52, slightly beyond the exact "dead center" line so that, when wanted, an immediate downward movement of the beam structure will be commenced. The driving and driven parts 29 and 63 and their adjuncts are of such construction that when the holder at 58 is released by the cord 59ª, the driven element 63 can move with the same speed as the driver 29 and be positively driven thereby with such equal speed; or it can rotate through a part of the downgoing arc of its cycle at a higher speed than the part 29. When the beam structure is to be lowered from the position shown in Fig. 2, the cord 59ª is pulled and the holder 58 opened; and if at such time the lifting arms 48—52 are on the dead center, power is instantly taken through the roller dog 74 to the clutch element 63 and it moves the lifting arms off from dead center and then the weight of the beam structure pressing down on the lifting arms pushes the clutch element 63 faster than and ahead of the driver 29. If the lifting arms 48, 52, are at such time slightly ahead of the dead center line, as shown in Fig. 2, this down pushing action of the beam structure instantly commences. And, in either case, this rapid down movement continues until the plow points strike the ground and the plows are so constructed that they instantly commence penetration and sink until they reach the predetermined depth. This action of the power transmitter, in permitting the plow points to strike, and then be free to penetrate, the ground, is of great importance in some soils. The "racing" of the clutch element 63 ceases when the plows strike the ground and thereafter, during the remainder of the lower part of the cycle the driving element 29 positively engages with the element 63 and forces it around to the point where the next lifting action is to commence (see Fig. 3), and at that point the rotation of the part 63 is automatically stopped by the holder 58 which invariably prescribes the point where the next lifting effort is to commence.

I herein, for briefness in description refer to the swinging or moving of the cranks downward, the cranks at such times acting as levers of a toggle-like system; and as they incline forward there is a relative slowing down (in forward movement) of their lower ends, this assisting the power devices to separate the cranks from the beam structure and force the latter upward, meaning that the lower ends which carry the ground wheel may be regarded as swinging backward and downward relatively to the frame structure, when the lifting power is being applied. I also refer to the clutch element 63 as being an "intermittingly acting" device, also as "rotatable intermittingly in one direction" meaning that it always moves in a predetermined direction, its movement being interrupted at predetermined instants, and that when it again commences to move, after an interruption, it moves on in the same direction in which it was moving prior to the interruption, that it to say, it is never reversed.

The mechanisms of the present class have been termed "frameless" plows; each however, having a plow supporting structure (mainly composed of the beams themselves, secured together), sufficiently rigid to carry and drag the earth-working parts. It is "frameless" in contradistinction from the plows of the earlier class known as sulky or riding gang plows. The latter were characterized by this that each was formed with a heavy frame supplemental to the beams and the bodies. The beams were carried on this frame by rotary bail cranks by which they were lifted and lowered.

In a plow of the present class the beams themselves as above described constitute the entire frame, practically, they requiring only light connecting and bracing bars, but a frame sufficiently strong to lower and lift and drag the plows and hold them up when lifted. It is the front end of this beam frame structure, as an entirety, together with the bodies, which as fully set forth, can be elevated by power-lifting devices through which is exerted the lifting force from one or more of the ground wheels. And it is this front end of the beam structure which is supported by the vertically swinging crank lifters at the sides, respectively, each connected to a ground wheel; one on the furrow side and the other on the land side.

And again the plows of the present sort differ radically from those of another earlier class. Each of those comprised, in addition to the tractor or engine, a platform or wheeled draft frame, supplemental to the beams; and to this supplemental draft frame each beam, at its front end, was secured by a vertically fixed hinge. The plow mechanisms of that sort were designed, with the features described, in the attempt to draw a large number of plow bodies, (from 6 to 20) together, through the soil. The loads upon the earth-engaging bodies were so great that although numerous devices were designed for automatically lifting them, it was found impossible to accomplish this unless each beam, with its body, was mounted independently of the others, so that they could be elevated successively, along a diagonal line.

The lifting had to be accomplished by raising the rear ends of the beams, and to permit this they were respectively secured by the separate horizontal vertically fixed pivots aforesaid to the draft platform, the lifting of the rear ends around the fixed front ends occurring around the axes of these pivots.

But experience demonstrated that the soil conditions are such as to largely prohibit the use of the earlier large tractors; smaller ones must be used. This limited the number of plow bodies that could be drawn; and it was reduced to three or four. Then to avoid the expense and complication of parts incident to the earlier plow mechanisms, each having a plurality of lifting devices for the large number of individually movable beams, another priniple of construction had to be followed to provide for the lifting. A plurality of lifters could not be provided; all of the three or four beams and bodies must be elevated at once by a single lifter. I found that the attempt to use a single lifter for the three or four bodies and their beams in accordance with the old plan, (that is, by lifting the rear end of this large frame with its several bodies around a fixed front pivot) was not successful, as the load was too great for the tractive force of the front wheels. I have so designed the parts that they begin the lifting action, not at the rear but, at the front end of the beam structure. This front end is carried upon devices which not only act to support it, but also act as parts of a power system for lifting; these devices being crank systems at the sides of the widened beam frame and hinged to it and resting upon ground wheels.

Nor do I confine myself to a constantly revolving axle, or to an axle to which both supporting wheels are secured, for while a greater amount of power is transmitted to the axle when both supporting wheels are secured thereto, my device is effectively operative when only one wheel is secured to the axle or when the axle does not revolve except when connected with the wheel or wheels at will, or the raising means may be so connected that they can be operated without the axle rotating.

What I claim is:

1. In a plow of the class described having a plurality of plow bottoms respectively carried by beams all of which are rigidly secured at their front ends to form a common frame and having a rear vertically adjustable furrow wheel a front furrow wheel and a land wheel, said frame being tiltable transversely around the rear furrow wheel and the land wheel, and tiltable at the front end around a rear furrow wheel, the combination with said frame, bottoms, and wheels, of two longitudinally swinging cranks mounted on the main frame and holding the front furrow wheel and the land wheel in proper positions relatively to the frame, a clutch having two automatically disengaging elements comprising a continuously rotating driving element actuated by the land wheel and an intermittingly acting element driven at option by the continuously rotating element, power transmitting devices interposed between the driven clutch element and the frame, and adapted to swing both of said cranks longitudinally of the frame, to move the front end thereof vertically around the rear furrow wheel to lift or lower the plows.

2. In a plow of the class described having a plurality of plow bottoms respectively carried by beams all of which are rigidly secured at their front ends to form a common frame and having a rear vertically adjustable furrow wheel a front furrow wheel and a land wheel, said frame being tiltable transversely around the rear furrow wheel and the land wheel, and tiltable at the front end around a rear furrow wheel, the combination with said frame, bottoms, and wheels, of two longitudinally swinging cranks mounted on the main frame and holding the front furrow wheel and the land wheel in proper positions relatively to the frame, a clutch having two automatically disengaging elements comprising a continuously rotating driving element actuated by the land wheel and an intermittingly acting element driven, at option, by the continuously rotating element, power transmitting devices interposed between the driven clutch element and the frame, said devices including rocking arms bearing upon the frame, and adapted to swing both of said cranks longitudinally to move the front end of the frame vertically around a transverse axis, and means supplemental to said power transmitting devices for leveling the frame around a longitudinal axis.

3. In a plow, the combination of an axle having land and furrow supporting wheels, bails pivotally mounted on the plow and forming a flexible connection between said plow and axle, bars pivotally mounted on the plow and adapted to support the latter on the axle, hand levers pivoted on the plow and connected to said bars and operable to independently adjust the latter, said adjustment increasing or diminishing the distance between the plow and axle and varying the depth of plowing.

4. In a plow, the combination of an axle having land and furrow supporting wheels, bails pivotally mounted on the plow and forming a flexible connection between said plow and axle, bars pivotally mounted on the plow and supporting the latter on the axle arms carried on the axle and adapted to operate against said bars to raise the plow, means to rotate said axle and means supported on the axle and operable at will to actuate said arms by traction power to raise said bars and plow.

5. In a plow, the combination of an axle having land and furrow supporting wheels, bails pivotally mounted on the plow and forming a flexible connection between said plow and axle, bars pivotally mounted on the plow and supporting the latter on the axle, arms carried on the axle and adapted to operate against said bars to raise the plow, means to rotate said axles, and means supported on the axle and operable at will to actuate said arms by traction power to raise said plow during a partial rotation of the axle.

6. In a plow, the combination of an axle having land and furrow supporting wheels, bails pivotally mounted on the plow and forming a flexible connection between said plow and axle, bars pivotally mounted on the plow and supporting the latter on the axle, arms carried on the axle and adapted to operate against said bars to raise the plow, means to rotate said axle, and means supported on the axle and operable at will to actuate said arms by traction power to raise said plow during a partial rotation of the axle and to lower said plow during a continued rotation of the axle.

7. In a plow, the combination of an axle having land and furrow supporting wheels, bails pivotally mounted on the plow and forming a flexible connection between the plow and axle, bars pivotally mounted on the plow and supporting the latter on the axle, arms supported on the axle in alinement with each other, said arms adapted to operate against said bars to raise the plow, a rod connecting said arms, means to rotate said axle, and means supported on the axle and operable at will to actuate said arms by traction power to raise said plow during a partial revolution of the axle.

8. In a plow, the combination of an axle having land and furrow supporting wheels, bails pivotally mounted on the plow and forming a flexible connection between the plow and axle, bars pivotally mounted on the plow and supporting the latter on the axle, arms supported on the axle radial thereto and in alinement with each other, said arms adapted to operate against said bar to raise the plow, a rod connecting said arms, means to rotate said axle, and means supported on the axle and operable at will to actuate said arms by traction power to raise said plow during a partial rotation of the axle and to lower said plow during a continued rotation of the axle.

9. In a frameless gang-plow, of the class described, having a beam structure with a rear furrow wheel, behind the bodies, on which its rear end rests when its front end is moving vertically, and composed of a plurality of beams each provided with a body, and all rigidly secured together, the combination with the aforesaid parts of a vertically-adjustable front ground wheel on the furrow side of the frame, a vertically-swinging crank system mounted on the frame at the land side thereof and having toggle-lever-like relationship therewith, a land wheel connected to said crank system and swinging vertically therewith, a primary power device continuously rotating with the land wheel, and a uni-directional rotating power-transmitting device optionally engageable positively with, and rotatable by, said power device through a predetermined part of a fixed cycle to positively swing the crank system downward, and rotatable in the same direction through the other part of said cycle to its initial position relative to the crank when it is in its uppermost position.

10. In a frameless gang-plow, of the class described, having a beam structure with a rear furrow wheel, behind the bodies, on which its rear end rests when its front end is moving vertically, and composed of a plurality of beams each provided with a body, and all rigidly secured together, the combination with the aforesaid parts of two vertically-swinging crank systems at the front end of said frame, a vertically-swinging furrow wheel adjacent and connected to one of said systems, and a vertically-swinging land wheel adjacent and connected to the other system, power means supported to be vertically vibratable with the land wheel, and rotated continuously therewith, intermittently-acting power-transmitting devices interposed between the frame and the swinging part of one of the crank systems, and the two-element clutch, of which one element rotates continuously with the power means, and the other is rotatable intermittently and uni-directionally by optional and positively-stopped actuations from the power means, the said intermittently acting clutch element being adapted to positively hold the cranks in their lowermost position.

11. In a frameless gang-plow, of the class described, having a beam structure with a rear furrow wheel, behind the bodies, on which its rear end rests when its front end is moving vertically, and composed of a plurality of beams each provided with a body, and all rigidly secured together, the combination with the aforesaid parts of a vertically-adjustable front ground wheel on the furrow side of the frame, a vertically swinging crank system mounted on the frame at the land side thereof and having toggle-lever-like relationship therewith, a land wheel connected to said crank system and swinging vertically therewith, manually controlled devices for varying the normal angles of the cranks relative to the front end of the beam frame, a primary power device continuously rotating with the land wheel, and an intermittingly acting power-transmitting device optionally engaged positively with, and rotated by, said power device through a predetermined part of a fixed cycle at each of its crank depressing actuations, said transmitting device being interposed between the cranks and the beam and adapted to move the cranks through the same path of operative travel irrespective of the adjustments effected by said manual controlling devices.

12. In a frameless gang-plow, of the class described, having a beam structure with a rear furrow wheel, behind the bodies, on which its rear end rests when its front end is moving vertically, and composed of a plurality of beams each provided with a body, and all rigidly secured together, the combination with the aforesaid parts of two vertically-swinging crank systems at the front end of said frame, a vertically swinging furrow wheel adjacent and connected to one of said systems, and a vertically swinging land wheel adjacent and connected to the other, manually controlled devices for varying the normal angles of the cranks relative to the front end of the beam, power means supported to be vertically vibratable with the land wheel and rotated continuously therewith, intermittently-acting power-transmitting devices interposed between the frame and the swinging part of the land-side crank system, and the two-element clutch, of which one element rotates continuously with the power means, and the other element is rotatable intermittently in one direction by optional and positively-stopped actuations from the power means and operatively connected to said power transmitting devices, the last said clutch element being arranged to positively hold the cranks in their lowermost positions when the plows are in their uppermost positions under any of the adjustment effected by the manually controlled devices.

13. In a frameless gang-plow, of the class described, having a front furrow wheel, a front land wheel, a rear furrow wheel, a plurality of plow bodies and a beam structure formed of a corresponding plurality of beams rigidly secured together and adapted as an entirety to have its front end relatively lifted by traction force from one or more of said front wheels, the combination with said parts of the cranks at the sides of the beam structure, one connected to the land wheel, and the other connected to the front furrow wheel, the clutch having two positively-acting interengageable elements interposed between the land side crank and the frame, and actuated by the land wheel, means for engaging said elements at option and for automatically disengaging them at the termination of a predetermined part of a fixed cycle of actuation, means positively actuated by the clutch for moving positively the land wheel and the front end of its crank downward and backward relatively to the beam structure, and means normally controlled by one of the clutch elements for automatically locking the cranks in their lowermost position and holding up the beam structure when elevated.

14. In a frameless gang-plow, of the class described, having a front furrow wheel, a front land wheel, a rear furrow wheel, a plurality of plow bodies and a beam structure formed of a corresponding plurality of beams rigidly secured together and adapted as an entirety to have its front end relatively lifted by traction force from one or more of said front wheels, the combination with said parts, of the cranks at the sides of the beam structure, one connected to the land wheel and the other connected to the front furrow wheel, the clutch having two positively-acting interengageable elements interposed between the cranks and the frame and actuated by one of said front wheels, both clutch elements, rotating continually in the same direction, one continuously and the other intermittently, means for engaging said elements at option and for automatically disengaging them at the termination of a predetermined part of a fixed cycle of actuation, and means positively actuated by the clutch for forcing the cranks and the beam structure in opposite directions, the intermittently acting clutch element being adapted to be locked against motion.

15. In a frameless gang-plow having a beam structure comprising a plurality of beams, each provided with a body, and all rigidly secured together, the combination with said structure of ground wheels at the sides thereof, respectively, cranks between the wheels and structure which are adjustable to permit the structure and bodies thereon to be raised and lowered relatively to the ground wheels, a rotary prime power member mounted on and swinging with one of the cranks, an intermittingly acting, unidirectional, rotary power transmitting device optionally connected positively to and automatically disconnectible from said power member, and devices actuated by said intermittingly acting power transmitter and arranged to directly contact with and thrust upward against an abutment rigid with the beam structure to lift the plows.

16. In a frameless gang-plow having a beam structure comprising a pluralty of beams, each provided with a body, and all rigidly secured together, the combination with said structure of ground wheels at the sides thereof respectively, cranks between the wheels and structure which are adjustable to permit the structure and bodies thereon to be raised and lowered relatively to the ground wheels, a rotary prime power member mounted on and swinging with one of the cranks, an intermittingly acting unidirectional, rotary power transmitting device optionally connected positively to and automatically disconnectible from said power member, and devices actuated by said intermittingly acting power transmitter and arranged to contact with and directly thrust upward against an abutment rigid with, and adjustable relatively to, the beam structure, to lift the plows.

17. In a frameless gang-plow having a beam structure comprising a plurality of beams, each provided with a body, and all rigidly secured together, the combination with said structure of ground wheels at the sides thereof, respectively, cranks between the wheels and structure which are adjustable to permit the structure and bodies thereon to be raised and lowered relatively to the ground wheels, a rotary prime power member mounted on and swinging with one of the cranks, an intermittingly acting, unidirectional, rotary power transmitting device optionally connected positively with, and automatically disconnectible from, said power member, and devices actuated by said intermittingly acting power transmitter and arranged to exert thrust against a hand lever normally rigid with the beam structure and accessible to an operator at points in front of the beam structure.

18. In a frameless gang-plow having a beam structure comprising a plurality of beams, each provided with a body, and all rigidly secured together, the combination with said structure of ground wheels at the sides thereof, respectively, cranks between the wheels and structure which are adjustable to permit the structure and bodies thereon to be raised and lowered relatively to the ground wheels, a lever adjustably mounted on the frame structure for adjusting the land side of said structure vertically, a second lever mounted thereon for adjusting the furrow side of the structure vertically, a rotary prime power member mounted on and swinging with one of the cranks, an intermittingly acting unidirectional, rotary power transmitting device optionally connected positively to, and automatically disconnectible from, said power member, and devices actuated by said intermittingly acting power transmitter and arranged to exert force on both of said levers to swing the cranks downward.

19. In a frameless gang-plow having a beam structure comprising a plurality of beams, each provided with a body, and all rigidly secured together, the combination with said structure of ground wheels at the sides thereof, respectively, cranks between the wheels and structure which are adjustable to permit the structure and bodies thereon to be raised and lowered relatively to the ground wheels, a two element clutch mechanism mounted on and swinging with one of said cranks, one element of which is driven continuously by the ground wheel on said crank, the other element of which is optionally rotated positively and intermittently by the first element, means carried by the crank for controlling the opening, closing and stopping of the intermittent clutch element and power transmitting devices actuated by said element for swinging the crank downward and the beam structure upward.

20. In a frameless gang-plow having a beam structure comprising a plurality of beams, each provided with a body, and all rigidly secured together, the combination with said structure of ground wheels at the sides thereof, respectively, cranks between the wheels and structure which are adjustable to permit the structure and bodies thereon to be raised and lowered relatively to the ground wheels, a two-element clutch having a driving member and a driven member both rotating continually in one direction, one continuously and the other intermittingly, a manually operated controller for starting, stopping and holding the intermittingly rotating element, said clutch and controller being mounted on and swinging with the crank, and power transmitting devices actuated by the intermittingly rotating clutch element for bearing downward on the cranks and lifting the beam structure.

21. In a frameless gang-plow having a beam structure comprising a plurality of beams, each provided with a body, and all rigidly secured together, the combination with said structure of ground wheels at the sides thereof, respectively, cranks between the wheels and structure which are adjustable to permit the structure and bodies thereon to be raised and lowered relatively to the ground wheels, a power transmitting mechanism comprising a driving element actuated by a ground wheel and rotating with predetermined speed continuously in one direction, and an intermittingly rotating element, optionally controlled means for operatively connecting said elements and adapted to rotate them with similar speed and to permit the driven element to rotate at a higher speed than that of the driving element, and means actuated by the driven element for bearing downward on the cranks and lifting the beam structure.

22. In a frameless gang-plow having a beam structure comprising a plurality of beams, each provided with a body, and all rigidly secured together, the combination with said structure of ground wheels at the sides thereof, respectively, cranks between the wheels and structure which are adjustable to permit the structure and bodies thereon to be raised and lowered relatively to the ground wheels, power transmitting mechanism comprising a driving element rotated by the ground wheel and continuously rotating in one direction with a predetermined speed, and a driven element adapted to be optionally connected operatively with the driving element and after connection therewith, to move with the aforesaid speed or with a greater speed, and power transmitting devices actuated by the driven element for forcing the cranks downward and lifting the beam structure.

23. In a frameless gang-plow having a beam structure, comprising a plurality of beams, each provided with a body, and all rigidly secured together, the combination with said structure of ground wheels at the sides thereof, respectively, adapted to exert traction force, cranks between the wheels and structure and adapted to be angulated relatively to the latter between variable fixed limits and to permit the front end of the structure and the bodies thereon to be raised and lowered relatively to the ground wheels, a rotary prime power member mounted on one of the cranks and driven continously by traction force, an intermittingly rotating power transmitting element optionally actuated by said power member through predetermined successive parts of a fixed cycle, manually controlled devices for varying simultaneously the positions of the lower and the upper limiting points of each angulation of the cranks, and power transmitting devices actuated by the said intermitting transmitting element for automatically causing the said angulating of the cranks.

24. In a frameless gang-plow having a beam structure comprising a plurality of beams each provided with a body and all rigidly secured together, the combination with said structure of ground wheels at the sides thereof, respectively, cranks between the wheels and structure, adapted to be automatically angulated vertically relatively to the structure, a rotary prime power member mounted on the crank and rotated continuously by traction power, an intermittingly rotating transmitting element optionally actuated by the power member, manually controlled devices for varying the position of the point of the uppermost limit and simultaneously and correspondingly varying the point of the lowermost limit of the angulating movement of the cranks, means actuated by said intermittingly driven element to lift the beam structure and elevate the plows to points above the ground surface and hold them at such points, and devices for releasing the holding means, the structure and the plows being normally free to move downward from the points of the uppermost limit of movement and permit the plows to be forced down below the surface to the automatically fixed point of working depth.

25. In a frameless gang-plow having a beam structure comprising a plurality of beams, each provided with a body, and all rigidly secured together, the combination with said structure of ground wheels at the sides thereof, respectively, cranks between the wheels and structure which are adjustable to permit the structure and bodies thereon to be raised and lowered relatively to the ground wheels, a power mechanism comprising a continuously rotating traction driven element mounted at the axis of a ground wheel, and an intermittingly acting power device optionally connected to and driven by the said continuously rotating element, a shaft mounted in the lower end of the crank which is adjacent said wheel, a power transmitter actuated by said shaft and positioned on the inner side of said crank and adapted to separate the lower end of the crank from the beam structure.

26. In a frameless gang-plow having a beam structure comprising a plurality of beams, each provided with a body, and all rigidly secured together, the combination with said structure of ground wheels at the sides thereof, respectively, cranks between the wheels and structure which are adjustable to permit the structure and bodies thereon to be raised and lowered relatively to the ground wheels, a clutch supported on one of said cranks and comprising a continuously rotating traction-driven element and an intermittingly rotating element adapted to be optionally connected with and automatically disconnected from the continuously rotating element, and controlling means supported on the crank for starting, stopping and holding the said intermittingly rotating element, and means actuated by the last said element for separating the crank from the beam structure.

In testimony whereof I affix my signature, in the presence of two witnesses.

CARL G. STRANDLUND.

Witnesses:
  JESSIE SIMSER,
  W. G. DUFFIELD.